United States Patent
Yan et al.

(10) Patent No.: US 9,372,322 B2
(45) Date of Patent: Jun. 21, 2016

(54) LENS MODULE

(71) Applicants: Junjie Yan, Shenzhen (CN);
Chuandong Wei, Shenzhen (CN);
Liangwei Wan, Shenzhen (CN);
Chunhuan Fang, Shenzhen (CN); Lei Zhang, Shenzhen (CN)

(72) Inventors: Junjie Yan, Shenzhen (CN);
Chuandong Wei, Shenzhen (CN);
Liangwei Wan, Shenzhen (CN);
Chunhuan Fang, Shenzhen (CN); Lei Zhang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 21 days.

(21) Appl. No.: 14/559,164

(22) Filed: Dec. 3, 2014

(65) Prior Publication Data

US 2015/0198785 A1 Jul. 16, 2015

(30) Foreign Application Priority Data

Jan. 13, 2014 (CN) ...................... 2014 2 0018803 U

(51) Int. Cl.
*G02B 7/02* (2006.01)
*G02B 13/00* (2006.01)

(52) U.S. Cl.
CPC .............. *G02B 7/021* (2013.01); *G02B 13/005* (2013.01)

(58) Field of Classification Search
CPC ......... G02B 7/021; G02B 7/022; G02B 7/003
USPC .................................. 359/793–795, 811, 819
See application file for complete search history.

(56) References Cited

U.S. PATENT DOCUMENTS

| | | | | |
|---|---|---|---|---|
| 7,944,630 B2 * | 5/2011 | Shyu | ...................... | G02B 7/022 264/2.5 |
| 2005/0264898 A1 * | 12/2005 | Kuchimaru | ............ | G02B 7/025 359/811 |
| 2009/0015945 A1 * | 1/2009 | Chen | ...................... | G02B 7/021 359/819 |
| 2011/0150459 A1 * | 6/2011 | Chang | .................... | G02B 7/021 396/529 |

* cited by examiner

*Primary Examiner* — Darryl J Collins
(74) *Attorney, Agent, or Firm* — IPro, PLLC; Na Xu

(57) ABSTRACT

A lens module includes a lens holder having a top wall that has a bottom surface, and a lens unit received by the lens holder. The lens unit includes a first lens adjacent to the top wall and a second lens attached to the first lens. The first lens includes a first object-side surface abutting against the bottom surface and a side surface abutting against an inner surface of the lens holder. The second lens includes a second object-side surface engaging with the first lens, and a jointing surface keeping a distance from the inner surface.

6 Claims, 4 Drawing Sheets

LENS MODULE

FIELD OF THE INVENTION

The present invention relates to optical apparatuses, and more particularly to a lens module used in a camera or other image pick-up device.

DESCRIPTION OF RELATED ART

With the rapid development of technologies, electronic devices having image pick-up functions, such as cameras, mobile phones, portable computers, tablets, are equipped with lens modules. For satisfying the demands of high quality pictures, lens modules are designed and manufactured with high precisions. As one of the key characters of a lens module, concentricity is much important for performing high quality pictures.

Generally, a lens module includes a holder for receiving a plurality of lens units therein. The lens units should be provided with high concentricity to be concentric with each other, and the combination of the lens unit should be concentric with the holder. During actual manufacturing process, the concentricity between the lens units, or between the lens unit and the holder is difficult to be controlled. Thus, this disclosure provides a lens module provided with special configuration for ensuring the concentricity thereof.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment.

Figure 1:
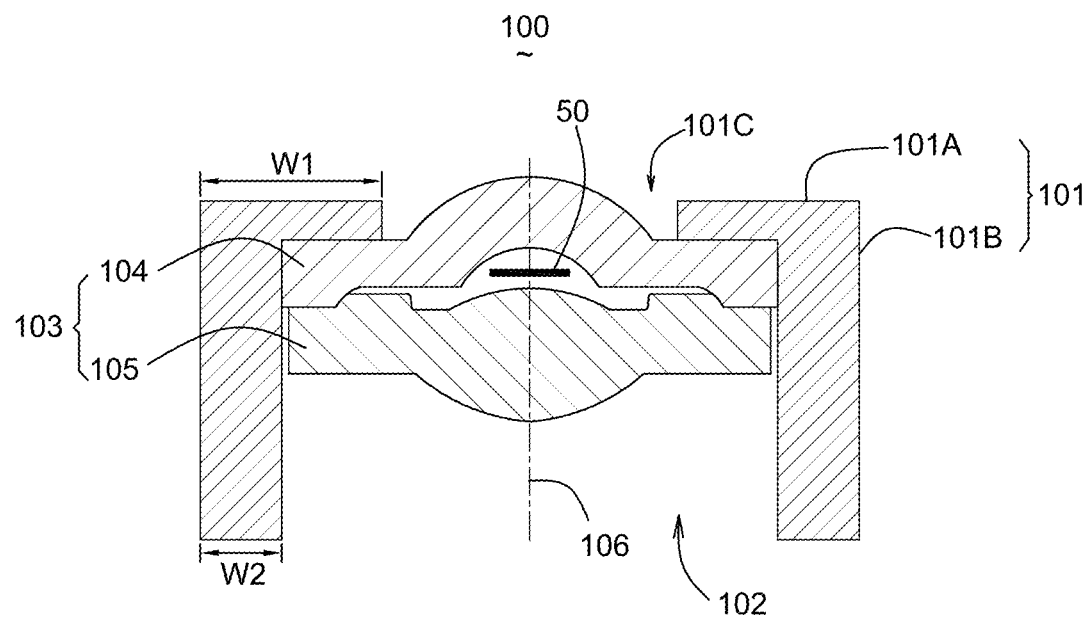
FIG. 1 is an illustrative cross-sectional view of a lens module in accordance with an exemplary embodiment of the present disclosure.
Figure 2:
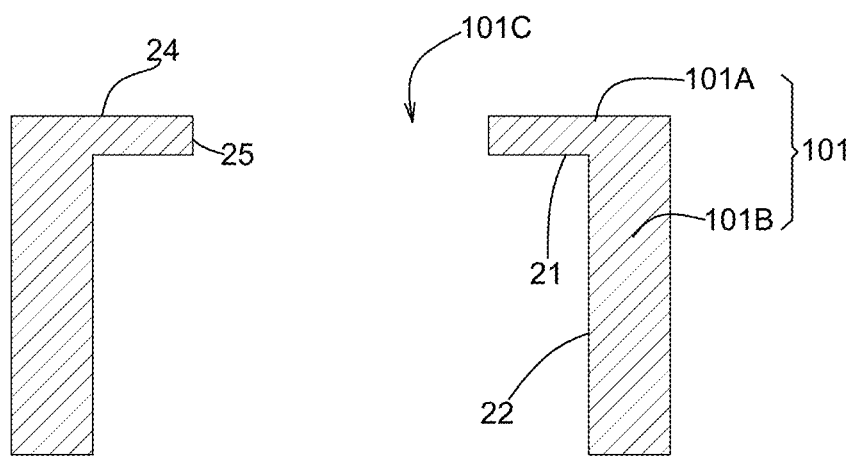
FIG. 2 is an illustrative cross-sectional view of a lens holder of the lens module in FIG. 1.

The present disclosure provides a lens module that could be used in a mobile phone, a tablet, or a digital camera. Referring to FIGS. 1-2, a lens module 100 includes a lens holder 101 and a lens unit 103 supported by the lens holder 101. The lens module has an optic axis 106. The lens holder 101 is symmetric about the optic axis 106, and comprises a first holder 101A and a second holder 101B extending vertically from an edge of the first holder 101A. In this embodiment, the second holder 101B is integrated with the first holder 101A. Along a direction perpendicular to the optic axis 106, a first thickness W1 of the first holder 101A is greater than a second thickness W2 of the second holder 101B. The first holder 101A includes a top surface 24, a bottom surface 21 opposed and parallel to the top surface 24, and a first inner surface 25 connecting the top surface 24 to the bottom surface 21. The first inner surface 25 forms an aperture 101C for passing lights into the holder. The second holder 101B includes a second inner surface 22 jointing with and perpendicular to the bottom surface 21 of the first holder 101A. The second inner surface 22 and the bottom surface 21 cooperatively form a receiving space 102 for receiving the lens unit 103 therein. The lens unit 103 includes a first lens 104 and a second lens 105 attached to the first lens 104. The first lens 104 locates between the first holder 101A and the second lens 105.

Figure 3:
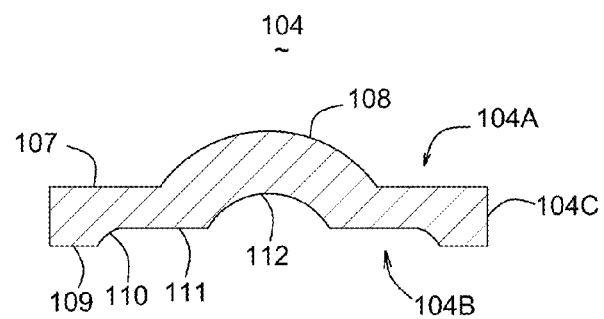
FIG. 3 is an illustrative cross-sectional view of a first lens used in the lens module in FIG. 1.
Figure 4:
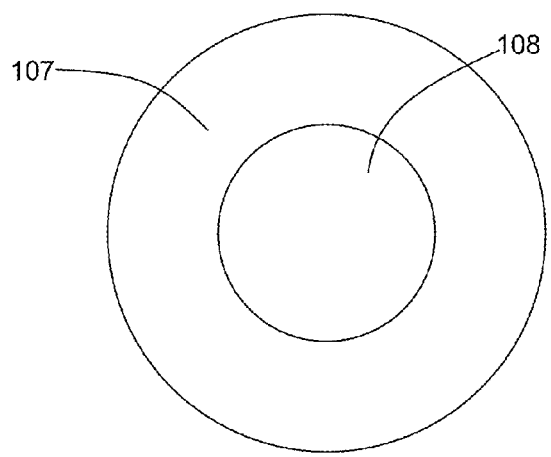
FIG. 4 is a top view of a first surface of the first lens.
Figure 5:
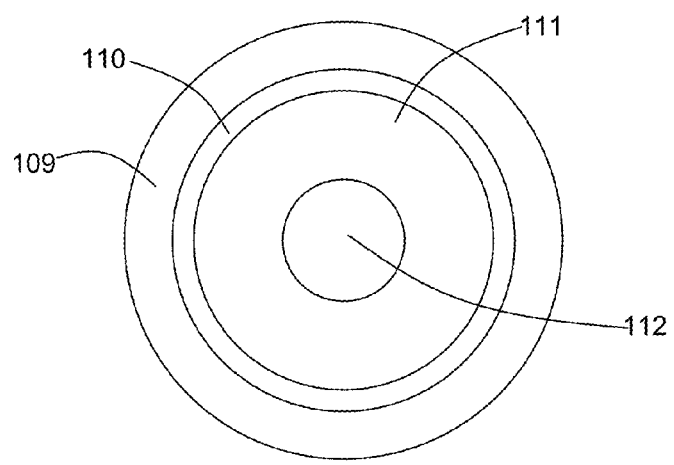
FIG. 5 is a bottom view of a second surface of the first lens.

Referring to FIGS. 3-5, the first lens 104 includes a first object-side surface 104A, a first image-side surface 104B opposed to the first object-side surface 104A, and a side surface 104C connecting the first object-side surface 104A to the first image-side surface 104B. A distance between the first object-side surface 104A and the first image-side surface 104B determines a thickness of the first lens 104. The first object-side surface 104A comprises, from a periphery to a center, a first plane 107 and a first optic surface 108 connecting with the first plane 107. The first plane 107 is perpendicular to the optic axis 106.

The first image-side surface 104B comprises, from the periphery to the center, a second plane 109 perpendicular to the optic axis, a first arc surface 110 connecting with the second plane 109, a third plane 111 connecting with the first arc surface 110 and perpendicular to the optic axis, and a second optic surface 112 connecting with the third plane 111. The first arc surface 110 is thus configured that the third plane 111 is closer to the first object-side surface 104A than the second plane 109. Alternatively, the first arc surface 110 can be also configured that the third plane 111 is farther from the first object-side surface 104A than the second plane 109.

Figure 6:
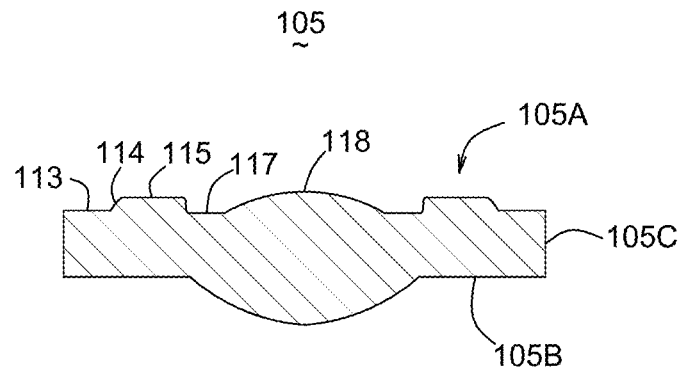
FIG. 6 is an illustrative cross-sectional view of a second lens used in the lens module in FIG. 1.
Figure 7:
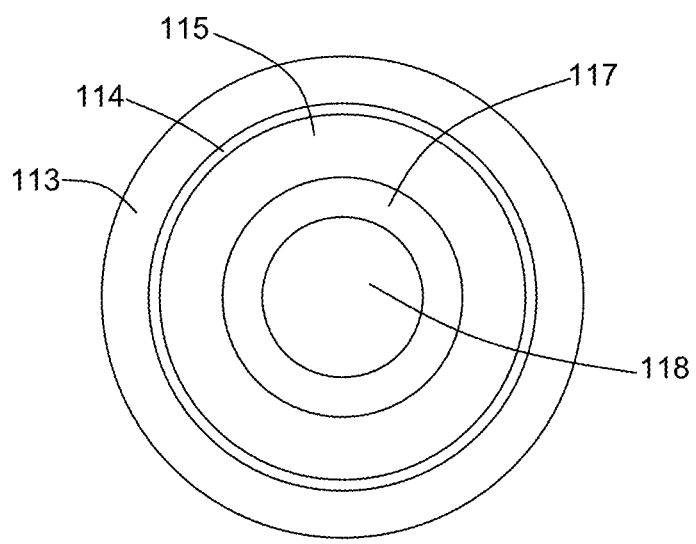
FIG. 7 is a top view of an upper surface of the second lens.

Referring to FIGS. 6-7, the second lens 105 comprises a second object-side surface 105A, a second image-side surface 105B opposed to the second object-side surface 105A, and a jointing surface 105C connecting the second object-side surface 105A to the second image-side surface 105B. A distance between the second object-side surface 105A and the second image-side surface 105B determines a thickness of the second lens 105. The second object-side surface 105A comprises, from a periphery to a center, a first carrying surface 113 perpendicular to the optic axis, a second arc surface 114, a second carrying surface 115 perpendicular to the optic axis, a fourth plane 117, and a third optic surface 118. By virtue of the second arc surface 114, the second carrying surface 115 is closer to the second image-side surface 105B than the first carrying surface 113. Corresponding to the first arc surface 110, the second arc surface 114 can also be configured that the second carrying surface 115 is farther from the second image-side surface 105B than the first carrying surface 113, which means that the first arc surface and the second arc surface are complementary structures to each other. And, the second carrying surface 115 and the fourth plane 117 form a step.

Figure 8:
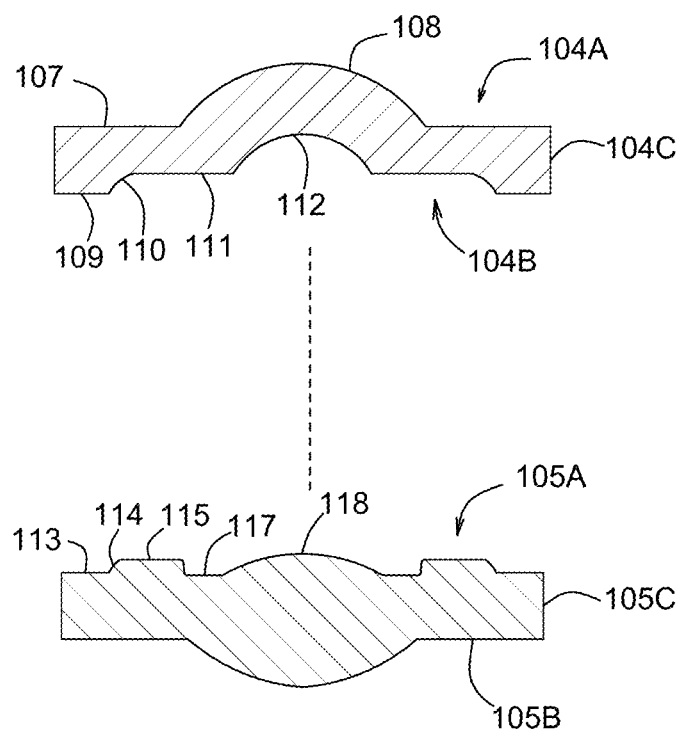
FIG. 8 is an illustrative view of the first lens ready to be attached to the second lens.

Referring to FIG. 8, and also referring to FIG. 1, while assembled, the second plane 109 abuts against the first carrying surface 113, the first arc surface 110 abuts against the second arc surface 114, and the third plane 111 spaces from the second carrying surface 115. In addition, a space is accordingly formed between the second optic surface 112 and the third optic surface 118 for placing a filter 50 therebetween.

Referring back to FIG. 1, also referring to FIGS. 2-8, when the combination of the first lens 104 and the second lens 105, i.e., the lens unit 103 is assembled with the lens holder 101, the first plane 107 abuts against the bottom surface 21 of the first holder 101A, and the side surface 104C abuts against the second inner surface 22 of the second holder 101B. Be noted that the jointing surface 105C keeps a distance from the second inner surface 22 of the second holder 101B.

The cooperation or engagement between the first arc surface 110 and the second arc surface 114 ensures the concentricity between the first lens 104 and the second lens 105. The engagement between the side surface 104C and the second inner surface 22 ensures the concentricity between the lens unit 103 and the lens holder 101. Since the jointing surface 105C of the second lens does not engage with the second inner surface 22 of the second holder 101B, the concentricity between the lens unit 103 and the lens holder 101 is determined solely by the engagement between the first lens 104 and the lens holder 101, which reduces the assembling tolerance and improves the assembling precision. And, the concentricity between the first lens 104 and the second lens 105 is solely determined by the engagement between the first arc surface 110 and the second arc surface 114. Another word, the first arc surface 110 of the first lens and the second arc surface 114 of the second lens define a first assembling precision, and the side surface 104C and the second inner surface 22 defines a second assembly precision. The first assembly precision ensures the concentricity between the first lens and the second lens, and the second assembly precision ensures the concentricity between the lens unit 103 and the lens holder 101.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, having an optic axis and comprising:
a lens holder having a first holder and a second holder extending vertically from an edge of the first holder, the first holder having a top surface perpendicular to the optic axis, a bottom surface opposed to and parallel to the top surface, and a first inner surface parallel to the optic axis and connecting the top surface to the bottom surface, the second holder having a second inner surface perpendicular to and jointing with the bottom surface of the first holder;
a receiving space formed by the bottom surface and the second inner surface;
a lens unit accommodated in the receiving space, the lens unit comprising:
a first lens having a first object-side surface, a first image-side surface, and a side surface connecting the first object-side surface to the first image-side surface, the side surface abutting against the second inner surface of the second holder;
a second lens having a second object-side surface, a second image-side surface, and a jointing surface connecting the second object-side surface to the second image-side surface, the jointing surface keeping a distance from the second inner surface of the second holder;
the first object-side surface comprising a first plane abutting against the bottom surface of the first holder;
the first image-side surface comprising a second plane parallel to the first plane, a first arc surface connecting the second plane, and a third plane connecting with the first arc surface and parallel to the second plane;
the second object-side surface comprising a first carrying surface abutting against the second plane, a second arc surface abutting against the first arc surface, and a second carrying surface keeping a distance from the third plane.

2. The lens module as described in claim 1 further comprising a gap between the first image-side surface and the second object-side surface for receiving a filter.

3. The lens module as described in claim 1, wherein the second object-side surface of the second lens further includes a fourth plane which is farther from the third plane of the first image-side surface than the second carrying surface.

4. The lens module as described in claim 1, wherein the lens holder includes an aperture formed by the first inner surface.

5. A lens module, comprising:
a lens holder defining an optic axis, and including a bottom surface and an inner surface perpendicular to the bottom surface for forming a receiving space;
a lens unit comprising a first lens and a second lens, the first lens comprising a first object-side surface having a first plane abutting against the bottom surface, a first image-side surface having a first arc surface, and a side surface abutting against the inner surface; the second lens comprising a second object-side surface having a second arc surface abutting against the first arc surface, a second image-side surface and a jointing surface keeping a distance from the inner surface.

6. The lens module as described in claim 5, wherein the second object-side surface of the second lens further comprises a first carrying surface abutting against the second plane of the first lens, and a second carrying surface closer to the first image-side surface than the first carrying surface.

* * * * *